United States Patent [19]
Peng

[11] Patent Number: 5,677,782
[45] Date of Patent: Oct. 14, 1997

[54] DRIVING MEANS FOR A HELICAL SCANNING PATTERN GENERATOR

[75] Inventor: Ke-Ou Peng, Delft, Netherlands

[73] Assignee: Opticon Sensors Europe B.V., Hoofddorp, Netherlands

[21] Appl. No.: 744,822

[22] Filed: Nov. 6, 1996

[30] Foreign Application Priority Data

Nov. 13, 1995 [EP] European Pat. Off. .............. 95203098

[51] Int. Cl.$^6$ ..................................... G02B 26/08
[52] U.S. Cl. ..................... 359/200; 359/198; 359/199; 359/225
[58] Field of Search ..................... 359/196–203, 359/212–221, 223–226; 235/454, 462–464, 467, 470, 472; 250/234–236; 358/473, 474, 489–493, 494

[56] References Cited

U.S. PATENT DOCUMENTS 5,293,265  3/1994  Aleshin et al. ...................... 359/225

FOREIGN PATENT DOCUMENTS 0 456 095  11/1991  European Pat. Off. .
0 671 697  9/1995  European Pat. Off. .

*Primary Examiner*—James Phan
*Attorney, Agent, or Firm*—Young & Thompson

[57] ABSTRACT

A scanning apparatus to scan an object by means of a light beam (B), provided with a housing (40), a light source (1) for generating the light beam (B), at least one mirror (6) for receiving and reflecting the light beam (B), which mirror (6) is, in operation, driven by first driving means (20) through a shaft (21) for continuous rotation about an axis of rotation (x) and by second driving means (30) by means of a carriage (117, 118) arranged on the shaft (21) such that the carriage (117, 118) and the shaft (21) are slidable relative to one another in an axial direction along the axis of rotation (x) for pivoting the at least one mirror (6) relative to the axis of rotation (x) about a pivoting point (102), a holder (115, 415) contacting the carriage (117, 118) by means (116) allowing the shaft (21) and the carriage (117, 118) to rotate concurrently within the holder (115, 415) and such that the holder (115, 415) and the shaft (21) can be shifted relative to one another in the axial direction.

12 Claims, 3 Drawing Sheets

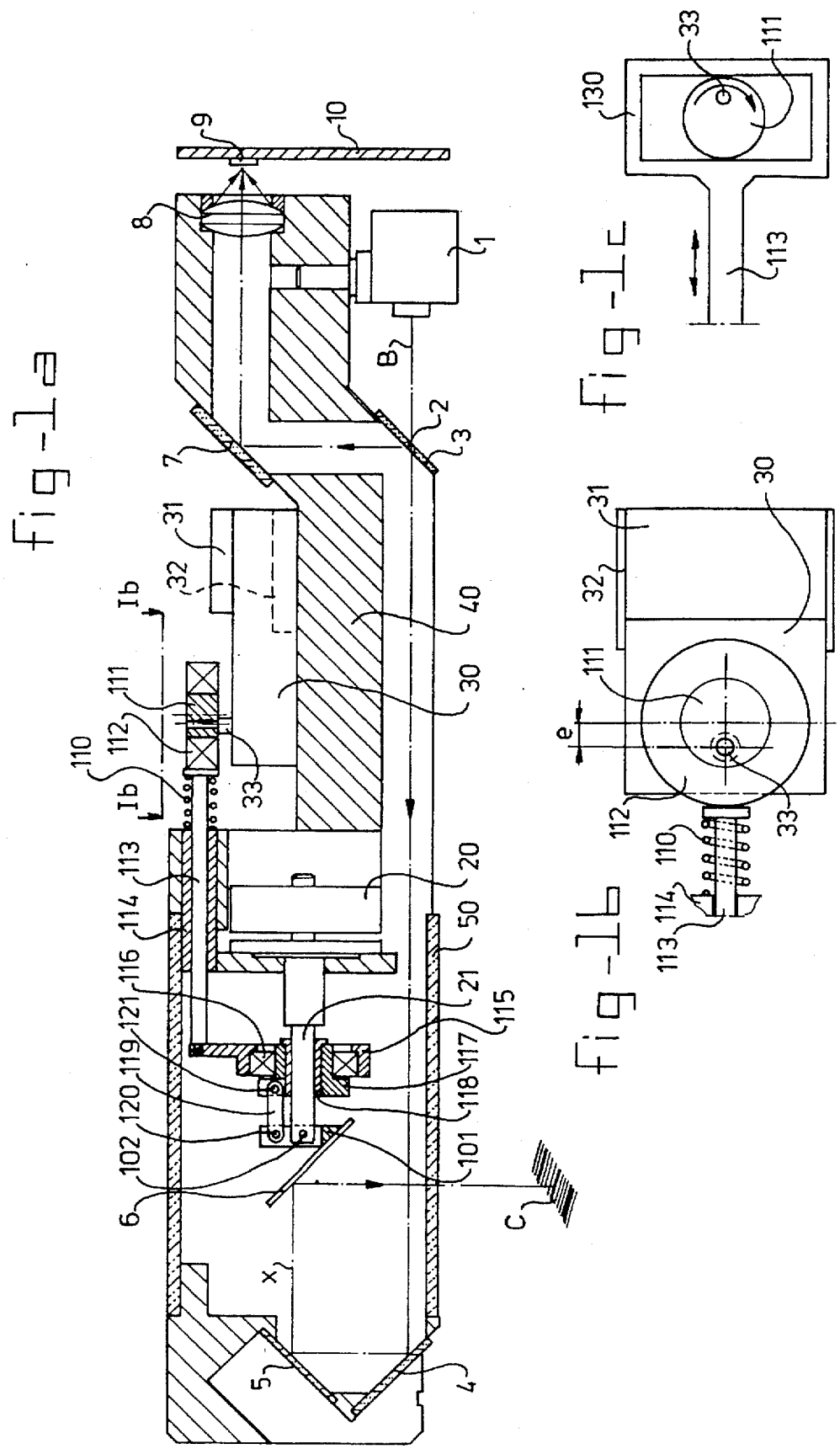

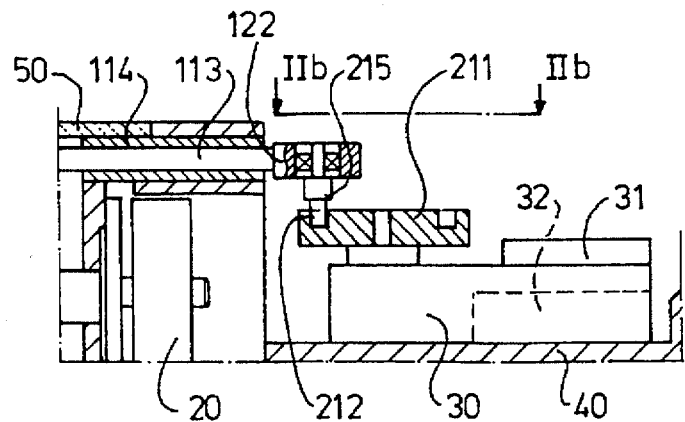
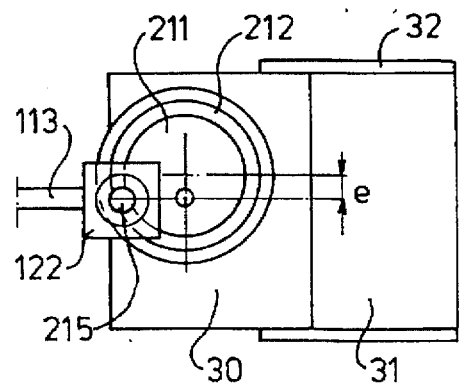
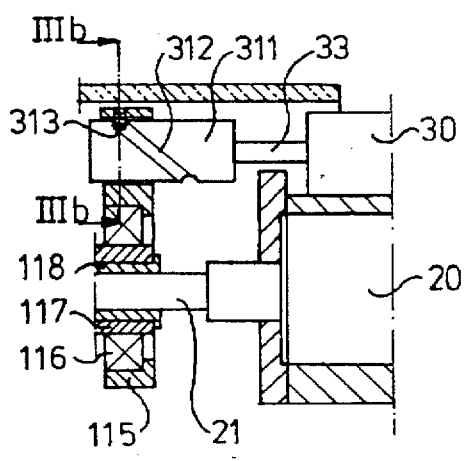
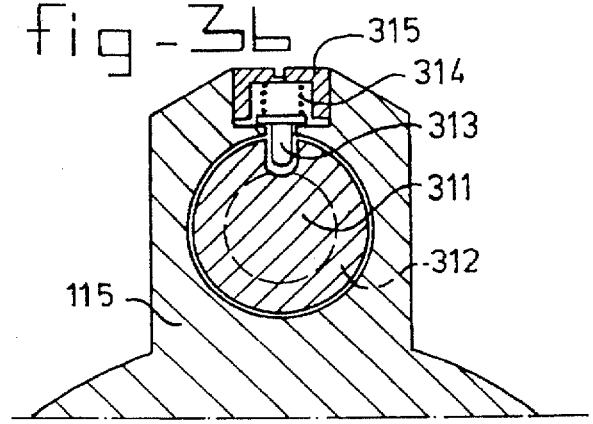

DRIVING MEANS FOR A HELICAL SCANNING PATTERN GENERATOR

BACKGROUND OF THE INVENTION

The present invention relates to a scanning apparatus to scan an object by means of a light beam, the apparatus comprising a housing, a light source for generating the light beam, at least one mirror for receiving and reflecting the light beam, which mirror is arranged to be driven by first driving means through a shaft for continuous rotation about an axis of rotation and by second driving means by means of at least a carriage arranged on the shaft such that the carriage and the shaft are slidable relative to one another in an axial direction along the axis of rotation for pivoting the at least one mirror relative to the axis of rotation about a pivoting point. Such a scanning apparatus is known from European patent application EP-A-0 571 697.

The scanning apparatus according to the latter European patent application is able to generate a helical scanning pattern. The known helical scanning pattern generator comprises at least one mirror which, in operation, is rotated about the axis of rotation and is pivoted relative to the axis of rotation. The light beam from the light source, preferably a laser beam, propagates preferably along the axis of rotation to the reflective side of the mirror. The known helical scanning pattern generator is especially suitable to read bar codes located on an internal cylindrical surface, such as a tube.

European patent application EP-A-0 571 697 presents several embodiments. The embodiments which are most close to the embodiments of the present invention are shown in FIGS. 5 and 6 of EP-A-0 571 697. The known embodiment of FIG. 5 of said European patent application comprises a motor and a shaft connected to the motor and to the mirror for rotating the mirror about the axis of rotation. The mirror is also connected through a suitable arm to a carriage which is slidable along the shaft of the motor. The carriage is provided with at least one magnet which can be attracted or repelled by a suitably arranged electromagnetic coil. By energizing the coil with an alternative current the carriage will be caused to make a movement to-and-fro along the shaft of the motor. The to-and-fro movement of the carriage is transmitted into a pivoting movement of the mirror about a pivoting point by means of the arm.

The FIG. 6 embodiment of EP-A-0 571 697 differs from the FIG. 5 embodiment in that no electromagnetic coil is provided but second magnetic means which can be moved to-and-fro along the shaft of the motor, thus, moving the carriage to-and-fro along the shaft of the motor by the magnetic force between the at least one magnet within a carriage and the magnetic means. In the FIG. 6 embodiment a spring is provided to counter-act the magnetic forces.

A disadvantage of the embodiment according to FIG. 5 of EP-A-0 571 697 is that a rather large current will be needed when the pivoting movement of the mirror is required to be rather low. A disadvantage of the FIG. 6 embodiment of EP-A-0 571 697 is that it is difficult to predict the precise pivoting movement of the mirror, especially at higher frequencies, since the axial movement of the carriage is more or less caused by elastic forces since there is no mechanical coupling to the second driving means. The carriage and its spring have a certain mass of inertia.

SUMMARY OF THE INVENTION

Therefore, the present invention has as a primary objective to provide a scanning apparatus which is able to produce a helical scanning pattern with a mechanical coupling between the at least one mirror and those driving means which, in operation, provide the at least one mirror with the pivoting movement relative to the axis of rotation of the mirror.

This objective is achieved by a scanning apparatus as defined above which is characterized by a holder contacting the carriage by means allowing the shaft and the carriage to rotate concurrently within the holder but preventing a translation of the carriage relative to the holder in the axial direction and such that the holder and the shaft can be shifted relative to one another in the axial direction. Preferably, the means comprise a ball-bearing. In such an arrangement the carriage forms as an inner ring of the ball-bearing whereas the holder forms the outer ring of the ball-bearing. The ball-bearing allows independent rotation and pivoting movements of the mirror. The carriage can be rotated, like an inner ring of a ball-bearing, relative to the holder used as the outer ring of the ball-bearing.

In a first embodiment the holder is, in operation, driven by the second driving means to move to-and-fro in the axial direction relative to the housing. Thus, in this first embodiment the holder can be driven together with the ball-bearing and the carriage to move to-and-fro in the axial direction while the carriage is still able to rotate within the holder during any axial movement. Thus, independent control of the rotation and pivoting movements of the mirror is achieved.

In the first embodiment defined above, the second driving means may be provided with a disc contacting a first end of a rod having a second end, opposing said first end, which is connected to the holder, the disc being rotatably connected to the second driving means and arranged for moving the rod such that, in operation, the holder is moved to-and-fro in the axial direction.

Such a disc can be designed in different shapes. In one shape the disc is circular and eccentrically rotatable by the second driving means, and connected to the first end of the rod through a further ball-bearing surrounding the disc. Since, in operation, the disc will be rotating eccentrically, the rod will make a to-and-fro movement in the axial direction which movement is translated into the pivoting movement of the mirror through a to-and-fro movement of the carriage along the shaft.

However, the disc may, alternatively, be provided with a slot having a predetermined shape and the first end of the rod may be provided with a pin-like element arranged within and guided by the slot. The slot will be designed with such a shape that when the disc is rotated by the second driving means the rod is caused to make a to-and-fro movement in the axial direction when the pin-like element is following the track of the slot.

The slot may be designed such that the to-and-fro movement will be sinusoidal. However, any other to-and-fro movement may be obtained by shaping the slot as required.

In the first embodiment, instead of using a disc, as defined above, the second driving means may be provided with a further shaft provided with a predetermined slot, the holder being provided with a pin-like element arranged within and guided by the slot. When the further shaft is, in operation, rotated by the second driving means the pin-like element will follow the track of the predetermined slot and will be forced to make a to-and-fro movement in the axial direction. This to-and-fro movement is transmitted to a same movement of the carriage which latter movement is translated in the pivoting movement of the mirror as required. Again, the slot in the further shaft may be shaped such that the carriage makes a sinusoidal movement when the further shaft is rotated with a continuous speed. However, the slot may be designed with any other shape to provide the carriage with any other axial movement as required.

In a second embodiment according to the invention the holder is fixed to the housing of the scanning apparatus such that the carriage is immovable in the axial direction, and the first driving means and the shaft are movable by the second driving means such that, in operation, the first driving means is driven by the second driving means to move to-and-fro in the axial direction relative to the housing in order to pivot the at least one mirror relative to the axis of rotation. In this second embodiment, the second driving means may be located in the housing behind the first driving means, thus, offering a possibility of reducing the diameter of the scanning apparatus. Of course, in the second embodiment the holder may be an integral part of the housing.

The means used in the second embodiment to provide the first driving means and the shaft with the to-and-fro movement relative to the holder may be any of the alternative means used to provide the carriage and the holder in the first embodiment, defined above, with the to-and-fro movement in the axial direction.

Both in the first and the second embodiment, the housing of the scanning apparatus may be provided with a cylindrical transparent window having an axis of symmetry substantially coinciding with the axis of rotation and surrounding at least the at least one mirror.

When such a cylindrical transparent window is used, preferably, no cables or other electrical components will be present between the window and the at least one mirror. Therefore, preferably, then, the scanning apparatus has an inner space divided in a first space portion in front of the at least one mirror and a second space portion behind the at least one mirror, the second space portion enclosing the first and second driving means, the light source and sensor means, the first space portion enclosing reflector means for receiving the light beam from the light source and for reflecting it to the at least one mirror. In this latter embodiment, only the light beam propagates through the space between the cylindrical transparent window and the mirror and, therefore, the light beam reflected by the mirror will never be obstructed by any electrical component.

BRIEF DESCRIPTION OF THE DRAWINGS

The invention will now be explained with reference to some drawings which are intended to illustrate the invention and not to limit its scope.

FIG. 1a shows a longitudinal cross-section through a first embodiment of a scanning apparatus provided with an eccentrically driven disc;

FIG. 1b shows a top view of a part of the scanning apparatus along line Ib—Ib in FIG. 1a;

FIG. 1c shows a partial top view of an alternative embodiment using an eccentrically driven disc;

FIG. 2a shows a partial longitudinal cross-section of an alternative to the first embodiment of FIG. 1a, in which the disc is provided with a predetermined slot;

FIG. 2b shows a partial top view of the alternative embodiment along line IIb—IIb in FIG. 2a;

FIG. 3a shows a partial longitudinal cross-section of a scanning apparatus in a further alternative embodiment according to the invention;

FIG. 3b shows a cross-section along the line IIIb—IIIb of the embodiment according to FIG. 3a;

DETAILED DESCRIPTION OF THE EMBODIMENTS

Figure 4:
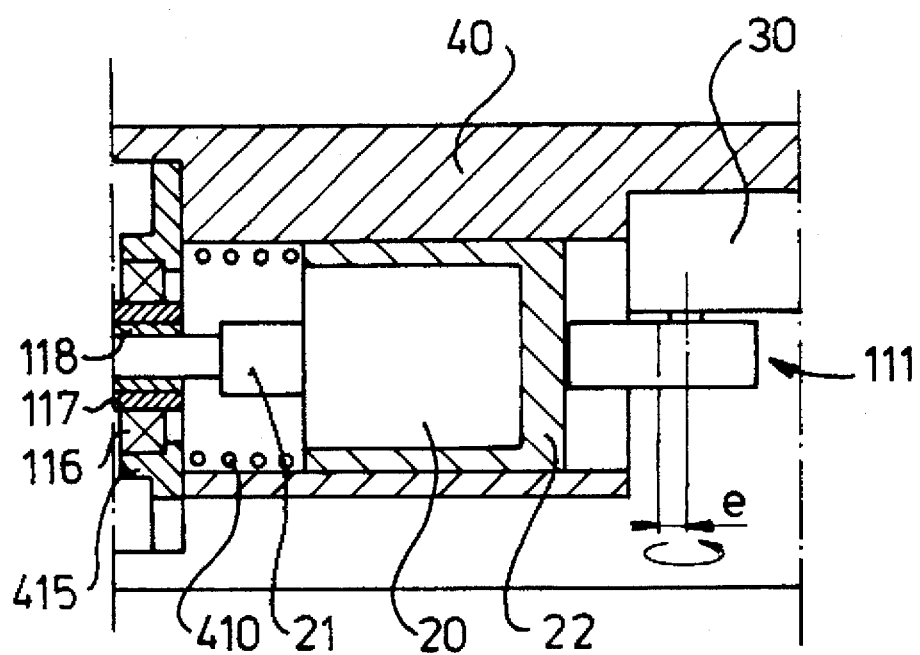
FIG. 4 shows a partial longitudinal cross-section of a further alternative embodiment of the scanning apparatus according to the invention.

In the drawings, the same reference numbers refer to the same elements.

FIG. 1a shows a longitudinal cross-section of a first embodiment of a scanning apparatus. The scanning apparatus is provided with a light source 1, e.g. a laser source.

The light source 1, in operation, generates a light beam B which is directed to a mirror 4 through a pinhole 2 in a mirror 3. The light beam B is reflected by the mirror 4 to a mirror 5 which, in turn, reflects the light beam B to a mirror 6. The mirror 6 reflects the light beam B through a cylindrical transparent window 50 to an object to be scanned, e.g. a bar code C on the inner surface of a tube (not shown).

The object C scatters the light beam B. The scattered light partly propagates back to the mirror 6 by which it is reflected towards the mirror 3 through mirrors 5 and 4. Mirror 3 reflects the back-scattered light to a mirror 7 which reflects it to a lens 8. The lens 8 collects the back-scattered light and focuses it to a photo-sensor 9. The photo-sensor 9 may be located on a printed circuit board 10 provided with suitable electronics (not shown) for evaluating the electrical signal from photo-sensor 9 resulting from the received back-scattered light. These electronics are known to a person skilled in the art and will not be explained here.

The mirror 6 is fixed to a support 101 which is connected to a shaft 21 of a motor 20. The support 101 is able to pivot about a pivoting point 102 which is, preferably, located on the axis of rotation x of the motor 21. The support 120 is connected to a carriage comprising a tubular component 117 and a bush 118 through an arm 119. The bush 118 and the tubular component 117 are fixed to one another and slidable along the shaft 21 of motor 20. When, in operation, the shaft 21 is rotated by the motor 20 the mirror 6, the support 101, the arm 119, the tubular component 117 and the bush 118 are caused to rotate together with the shaft 21.

The arm 119 is connected to the support 101 at a pivoting point 120 and to the tubular component 117 at a pivoting point 121.

The tubular component 117 is connected to a holder 115 by means of a ball-bearing 116 which surrounds the tubular component 117. The tubular component 117 can be seen as the inner part of a conventional circular ball-bearing 116 whereas the holder 115 can be seen as the outer part of such a circular ball-bearing. Thus the tubular component 117 is able to rotate when shaft 21 rotates within the holder 115.

The holder 115 is connected to a rod 113 which is slidably accommodated within a bush 114. The rod 113 is movable to-and-fro in a direction parallel to the direction of the axis of rotation x.

At the opposite end the rod 113 is connected to the outer ring of a circular ball-bearing 112. The inner ring of the circular ball-bearing 112 is connected to a disc 111. The disc 111 is connected to a shaft 33 of the motor 30. The shaft 33 is located eccentrically from the axis of symmetry of the circular ball-bearing 112. The distance between that axis of symmetry and the centre of the shaft 33 is indicated with e (see also FIG. 1b).

Instead of a fixed connection between the rod 113 and the outer ring of the ball-bearing 112, the end of the rod 113 may be provided with a surface which is pressed against the ball-bearing 112 by means of a spring 110, as indicated in FIGS. 1a and 1b.

In the embodiment shown in FIGS. 1a and 1b, the motor 30 is fixed to the housing 40 of the scanning apparatus by means of suitable fixing means schematically indicated with reference numbers 31, 32.

Since in the apparatus according to FIGS. 1a and 1b, the disc 111 is eccentrically driven by motor 30, the rod 113 will be forced to make a to-and-fro movement over a distance 2e in an axial direction whenever the motor 30 is operating. This to-and-fro movement of the rod 113 is translated to an equal to-and-fro movement of the holder 115 and the tubular component 117. This to-and-fro movement of the tubular component 117 is translated into a to-and-fro movement of pin 119 causing a pivoting movement of the mirror 6 supported by the support 101 about pivoting point 102. Note, that this pivoting movement of the mirror 6 about the pivoting point 102 is entirely independent of the rotation movement of the mirror 6 caused by the motor 20. Thus, the ball-bearing 116 provides the possibility of an entirely independent control of the pivoting and rotation movements of mirror 6. Still, both the rotation and the pivoting movements are established by using mechanical couplings. Therefore, no problems of mass inertia are involved.

In an alternative embodiment to the one shown in FIGS. 1a and 1b, the end side of rod 113, which in the embodiment according to FIGS. 1a and 1b is contacting the bearing 112, could be provided with a small wheel or a small ball. Such a small wheel or ball could be pressed by the spring 110 directly to the outer edge of the disc 111, which outer edge could have any predetermined shape. Thus, when rotating the disc 111, then, the rod 113 could be forced to make any to-and-fro movement in dependency of the predetermined shape of the outer edge of disc 111. In such an embodiment (not shown) the circular ball-bearing 112 would be omitted and the disc 111 could be designed to have any shaped outer edge in accordance with the required movement of rod 113. Whereas the embodiment shown in FIGS. 1a and 1b provides the rod 113 with a sinusoidal movement when the motor 30 rotates with a continuous speed, such a latter embodiment would not be restricted to a sinusoidal to-and-fro movement.

A further alternative embodiment is shown in FIG. 1c, in which the rod 113 is connected to a rectilinear frame 130. The frame 130 accommodates the disc 111 which is eccentrically driven by shaft 33 of motor 30 (not shown). The disc 111 touches two opposite sides of the frame 130, thus, forcing the frame 130 and the rod 113 to make the desired to-and-fro movement. Since disc 111 touches two opposite sides of frame 130 the spring 110 can be disposed with.

FIGS. 2a and 2b show schematically an alternative embodiment of the scanning apparatus. In the embodiment according to FIGS. 2a and 2b the disc 111 and the ball-bearing 112 are replaced by another disc 211. The disc 211 is provided with a slot 212. The end of the rod 113 adjacent the disc 212 is provided with a block 122. The block 122 is provided with a pin-like element 215 which is arranged in the slot 212. The slot 212 may be circular, in which case the disc 211 is driven eccentrically by the motor 30. Then, when the disc 211 is rotated by the motor 30, the pin-like element 215 will follow the slot 212 and will be forced to make a to-and-fro movement in the direction parallel to the axis of rotation x of mirror 6. This to-and-fro movement of the pin-like element 215 is transmitted to a same to-and-fro movement of the tubular component 117, like in the arrangement according to FIGS. 1a and 1b.

The distance of eccentricity of disc 211 is indicated by letter e in FIG. 2b. The distance of eccentricity e and the shape of the slot 212 can be designed such that any required to-and-fro movement of the rod 113 can be obtained by a continuous rotation of the motor 30. Thus, the embodiment according to FIGS. 2a and 2b has a large freedom for designing a required to-and-fro movement of the rod 113 and thus of the pivoting movement of the mirror 6.

FIGS. 3a and 3b show a further embodiment of the present invention. In this embodiment, the shaft 33 of motor 30 is arranged in a direction substantially parallel to the axis of rotation x of mirror 6. The shaft 33 is provided with an enlargement 311 provided with a slot 312. The slot 312 is circumferential and defines a plane intersecting the axis of rotation of motor 30 at a predetermined angle between 0° and 90°. However, the slot 312 need not necessarily define a flat surface.

As better shown in FIG. 3b, the holder 115 is provided with a pin-like element 313 pressed into the slot 312 by a suitable spring 314 and a screw 315.

When the motor 30 rotates the shaft 33 rotates and the pin-like element 313 is forced to follow the slot 312. Thus, the rotating movement of shaft 33 is translated into a to-and-fro movement of the holder 115 in a direction substantial parallel to the axis of rotation x of the mirror 6. Through the tubular component 117 this to-and-fro movement is translated into the pivoting movement of the mirror 6, as required. Note, again the pivoting movement of mirror 6 is controlled independently of the rotating movement of the mirror 6, although for both movements mechanical couplings are used.

In the embodiment according to FIGS. 3a and 3b, the actual pivoting movement of the mirror 6 depends on the shape of slot 312 in the enlargement 311 of shaft 33.

In each of the embodiments according to FIGS. 1a, 1b, 2a, 2b, 3a and 3b the motor 20 is fixed to the housing 40 of the scanning apparatus. In operation, the holder 115 is driven by motor 30 to move to-and-fro in a direction substantially parallel to the axis of rotation x of mirror 6.

Alternatively, the holder 115 can be fixed to the housing 40, whereas the motor 20 can be forced to make a to-and-fro movement in a direction along the axis of rotation x. Such an alternative embodiment is shown in FIG. 4.

In the embodiment according to FIG. 4, the motor 20 is supported by a support 22 which is slidably accommodated within the housing 40. A spring 410 may be provided between the support 22 and the housing 40, as indicated in FIG. 4. The holder is now indicated with reference number 415. Although the holder 415 is indicated to be a separate element, the holder 414 may be an integral part of the housing 40.

The motor 30 is located behind the motor 20. The support 22 may be connected to the outer ring of ball-bearing 112 (not shown in FIG. 4), the inner ring of which can be connected to disc 111, like in the arrangement according to FIGS. 1a and 1b. Again the disc 111 is eccentrically driven by motor 30. Thus, in operation, the support 22 and motor 20 are forced to make a to-and-fro movement in an axial direction along the axis of rotation x. Instead of the combination of disc 111 and ball-bearing 112, support 22 may be moved to-and-fro by any other mechanical driving mechanism, known to person skilled in the art, e.g. like the arrangements shown in FIGS. 2a, 2b, 3a, 3b.

As can be seen from FIG. 4, the motor 30 can at least partly be located behind motor 20 instead of adjacent to motor 20 as in the embodiments according to FIGS. 1a, 1b, 2a, 2b, 3a and 3b. Thus, the embodiment according to FIG. 4 offers the possibility of a smaller diameter of the scanning apparatus which is advantageous when the scanning apparatus is to be used to scan e.g. bar codes at the inner surface of small tubes.

It is to be understood that the embodiments shown in the figures only represent possible alternatives within the scope of the invention as defined by the annexed claims. One alternative to the embodiments shown would, e.g., be provided with a ball-bearing instead of the bush 118. Thus, the friction between the tubular component 117 and the shaft 21 would be further reduced.

In a further alternative embodiment (not shown) the ball-bearing 116 could be replaced by a bush surrounding tubular component 117, the bush being rotatably arranged within the tubular component 117 but being only able to translate in the axial direction—as defined by axis of rotation x—concurrently with tubular component 117. This may, e.g., be achieved by providing such a bush with a circular, inwardly extending ridge and tubular component 117 with a circular groove accommodating that ridge. Such a further alternative embodiment is especially useful in applications where the mirror 6 is only needed to rotate with relatively low speed. Such a ridge may, alternatively, be replaced by one or more pins guided by the groove.

Instead of one mirror 6 several mirrors could be provided, each of which could have a different angle of inclination to the axis of rotation x and each of which would be divided by a different arm connected to the tubular component 117, like in the arrangement according to FIG. 7 of European Patent Application EP-A-0.571.697, referred to above.

I claim:

1. A scanning apparatus to scan an object by means of a light beam (B), the apparatus comprising a housing (40), a light source (1) for generating said light beam (B), at least one mirror (6) for receiving and reflecting said light beam (B), which mirror (6) is arranged to be driven by first driving means (20) through a shaft (21) for continuous rotation about an axis of rotation (x) and by second driving means (30) by means of at least a carriage (117, 118) arranged on said shaft (21) such that the carriage (117, 118) and the shaft (21) are slidable relative to one another in an axial direction along said axis of rotation (x) for pivoting said at least one mirror (6) relative to said axis of rotation (x) about a pivoting point (102) characterized by a holder (115, 415) contacting said carriage (117, 118) by means (116) allowing said shaft (21) and said carriage (117, 118) to rotate concurrently within said holder (115, 415) but preventing a translation of said carriage relative to said holder (115, 415) in the axial direction and such that said holder (115, 415) and said shaft (21) can be shifted relative to one another in the axial direction.

2. A scanning apparatus according to claim 1, wherein said means comprise a ball-bearing (116).

3. A scanning apparatus according to claim 2 wherein said holder (115) is, in operation, driven by said second driving means (30) to move to-and-fro in said axial direction relative to said housing (40).

4. A scanning apparatus according to claim 2 wherein said holder (115) is fixed to said housing (40) such that said carriage (117, 118) is immovable in said axial direction, and wherein said first driving means and said shaft (21) are movable by said second driving means such that, in operation, the first driving means is driven by said second driving means (30) to move to-and-fro in said axial direction relative to said housing (40) in order to pivot said at least one mirror (6) relative to said axis of rotation (x).

5. A scanning apparatus according to claim 1 wherein said holder (115) is, in operation, driven by said second driving means (30) to move to-and-fro in said axial direction relative to said housing (40).

6. A scanning apparatus according to claim 5 wherein said second driving means (30) is provided with a disc (111) contacting a first end of a rod (113) having a second end, opposing said first end, which is connected to said holder (115), said disc (111) being rotatably connected to said second driving means (30) and arranged for moving said rod (113) such that, in operation, said holder (115) is moved to-and-fro in said axial direction.

7. A scanning apparatus according to claim 6 wherein said disc (111) is circular and eccentrically rotatable by said second driving means (30), and connected to said first end of said rod (113) through a further ball-bearing (112) surrounding said disc (111).

8. A scanning apparatus according to claim 6 wherein said disc (111) is provided with a slot (212) having a predetermined shape and said first end of said rod (113) is provided with a pin-like element (214) arranged within and guided by said slot (212).

9. A scanning apparatus according to claim 5 wherein said second driving means (30) is provided with a further shaft (311) provided with a predetermined slot (312), and wherein said holder (115) is provided with a pin-like element (313) arranged within and guided by said slot (312).

10. A scanning apparatus according to claim 1 wherein said holder (115) is fixed to said housing (40) such that said carriage (117, 118) is immovable in said axial direction, and wherein said first driving means and said shaft (21) are movable by said second driving means such that, in operation, the first driving means is driven by said second driving means (30) to move to-and-fro in said axial direction relative to said housing (40) in order to pivot said at least one mirror (6) relative to said axis of rotation (x).

11. A scanning apparatus according to claim 1 wherein the housing (40) is provided with a cylindrical transparent window (50) having an axis of symmetry substantially coinciding with said axis of rotation (x) and surrounding at least said at least one mirror (6).

12. A scanning apparatus according to claim 1 having an inner space divided in a first space portion in front of said at least one mirror (6) and a second space portion behind said at least one mirror (6), said second space portion enclosing said first (20) and second (30) driving means, said light source (1) and sensor means (9), said first space portion enclosing reflector means (4, 5) for receiving said light beam (B) from said light source (1) and for reflecting it to said at least one mirror.

* * * * *